Figures 1, 2:
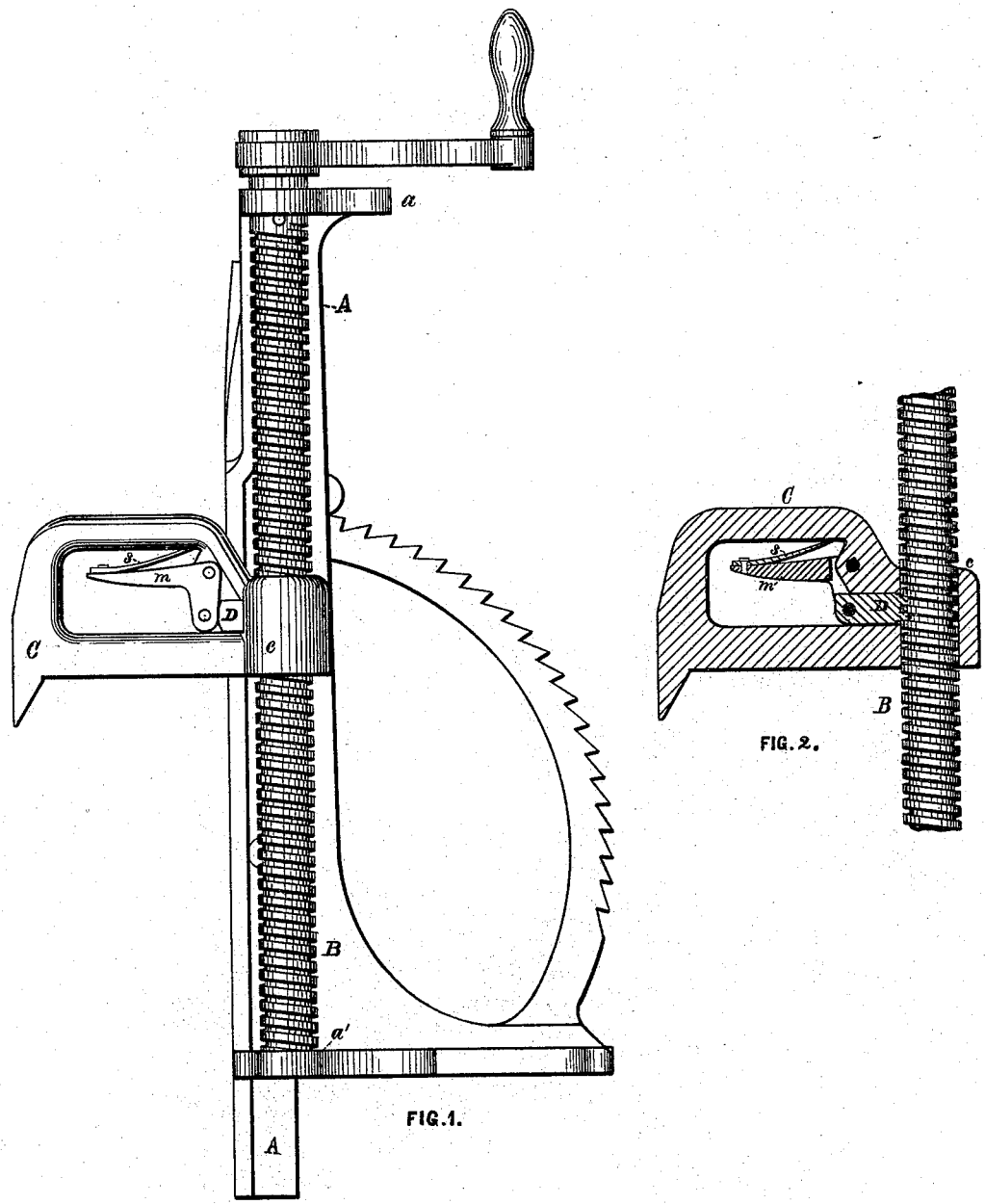

D. LANE.
SAW MILL DOG.

No. 177,943. Patented May 30, 1876.

WITNESSES.
Chas. N. Swan
H. G. Olmsted

INVENTOR.
Dennis Lane
by William W. Swan
his attorney

UNITED STATES PATENT OFFICE.

DENNIS LANE, OF MONTPELIER, VERMONT.

IMPROVEMENT IN SAW-MILL DOGS.

Specification forming part of Letters Patent No. 177,943, dated May 30, 1876; application filed April 27, 1876.

*To all whom it may concern:*

Be it known that I, DENNIS LANE, of Montpelier, in the State of Vermont, have invented an Improvement in Saw-Mill Dogs, of which the following is a specification:

My invention is an improvement upon a dog patented to me in reissued Letters Patent No. 4,745; and consists in combining in one dog the advantages of a screw-dog and of a swinging and sliding dog.

In the drawings, Figure 1 is a side elevation of my new dogging apparatus attached to one of the uprights of a saw-mill carriage. Fig. 2 is a section through the dog, and a part of a threaded post, hereinafter fully described.

A is the upright. It may be attached to a set-beam, or may slide back and forth on a head-block. B is a revolving post, having bearings in side projections $a$ and $a'$ from the upright A, and turned by a crank, as shown. The post has a spiral thread of a uniform pitch, as shown. C is the dog, having an eye, $c$, with a diameter slightly larger than that of the post taken from periphery to periphery of the threads, so that the dog slides up and down the post freely, and may be swung back from the working or bearing face of the upright. D is a female half-nut, to engage the threads of the post B, and sliding in and out in a slot in the eye of the dog, being drawn back by a bent lever, $m$, pivoted in the handle of the dog, and having one arm extending along the handle, as shown. A spring, $s$, tends to keep the half-nut engaged with the threads of the post.

The operation is as follows: The sawyer, in grasping the dog by the handle, will press the bent lever, so as to release the half-nut from the threads of the post. He then slides the dog downward on the post until its point strikes the log, when, letting go the handle, the half-nut engages with the threads of the post. A turn of the crank then drives the point of the dog into the log with the power of the screw. The manner of releasing the dog and swinging it back out of the way of the saw is obvious.

I claim—

The revolving threaded post B, in combination with the dog C, provided with an eye, $c$, and spring half-nut D, substantially as described, for the purpose specified.

DENNIS LANE.

Witnesses:
WILLIAM W. SWAN,
CHAS. H. SWAN.